Figure 1:
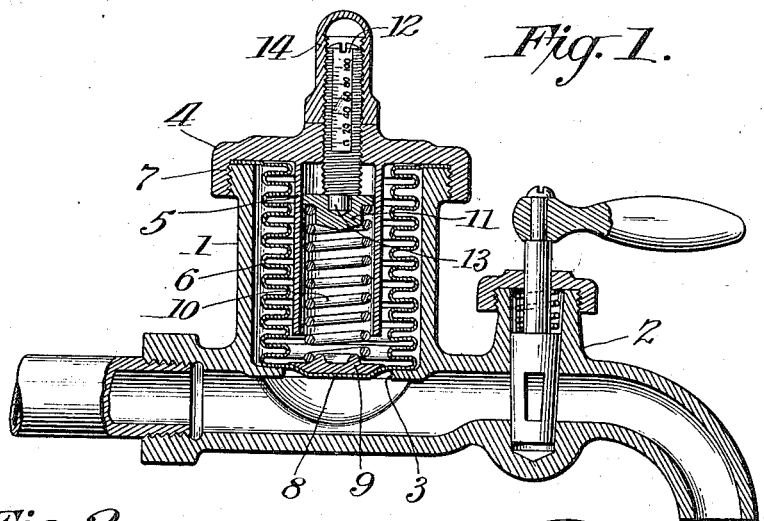

W. M. FULTON.
SHOCK ABSORBER FOR WATER PIPES.
APPLICATION FILED MAY 9, 1914.

1,169,250.

Patented Jan. 25, 1916.

Witnesses:
J. B. Wegenast
R. C. Fitzhugh

Inventor
Weston M. Fulton.
By
Mauro, Cameron, Lewis & Massie
Attorneys.

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

SHOCK-ABSORBER FOR WATER-PIPES.

1,169,250.   Specification of Letters Patent.   Patented Jan. 25, 1916.

Application filed May 9, 1914. Serial No. 837,443.

*To all whom it may concern:*

Be it known that I, WESTON M. FULTON, a citizen of the United States of America, and resident of Knoxville, Tennessee, have invented a new and useful Improvement in Shock-Absorbers for Water-Pipes, which invention is fully set forth in the following specification.

This invention relates to shock absorbers for water pipes, and has for its object to provide a simple and efficient means for overcoming the objectionable effects of shock when the flow of water is suddenly cut off or stopped.

Heretofore various means have been proposed for obviating the hammer-like action in water pipes when the flow has been stopped by closing the spigot, such as by the location of an air reservoir in some part of the pipe whereby the air may act as a cushion. Owing to the solvent action of water on air, in time the water fills the air chamber and its action as a shock absorber ceases. Hollow rubber balls have also been placed in the pipe, but they soon yield to the action of the water, crack and leak, and fill with water thereby becoming ineffective.

My invention overcomes the above objections and secures the above object by providing the water conduit with a collapsible and expansible metal vessel which is exposed to the water in the conduit, and with means for applying a yielding pressure in opposition to the pressure due to the water and capable of increasing with the increase of water pressure. The collapsible and expansible vessel may be placed in an enlarged section in the conduit, or in a chamber opening into the conduit, and preferably near the valve or spigot. The means employed for applying the yielding pressure which is to act against the water pressure may assume various forms, two of which are given by way of example. If the vessel is to be located in a section of the water conduit where it is surrounded on all sides by water, I prefer to hermetically seal, inside the vessel, a compressible fluid, such as air under pressure. In cases where the vessel is to be located in a side chamber opening into the conduit, I may, and preferably, use spring pressure which may be regulated by means outside the casing of the chamber. The collapsible and expansible vessel may be of any desired construction. The one shown has a tubular body of flexible corrugated metal, such as brass or copper. One end of the tube is closed by an inflexible wall and is movable, and the opposite end is stationary and either closed by a similar wall or it may be closed by a part of the casing wall within which the vessel is located, or it may be open. To avoid injurious strains on the walls of the vessel, due to the action of the pressure used in extending the tubular walls, means are provided to limit this extension.

While my device is peculiarly useful in connection with quick acting valves and with valves so located that the water pressure tends to hammer them on their seats, I do not desire to be limited in its use to this form of valve, because the device is useful with all valves controlling flow of water in conduits where the inertia and momentum give rise to hammering in the pipes and where it is desired to overcome such objectionable action.

In order that the invention may be more readily understood, reference is had to the accompanying drawings which illustrate some of the mechanical expressions of the inventive idea, but it is to be understood that the drawings are merely intended to assist the description and not to define the limits of the invention.

Figure 2:
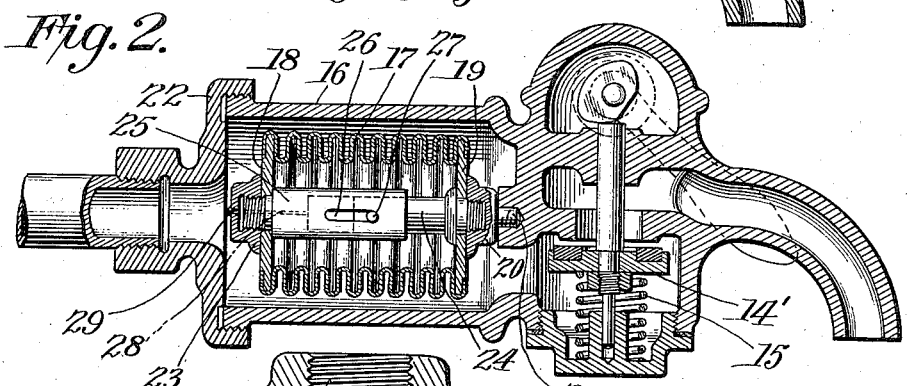
Figure 3:
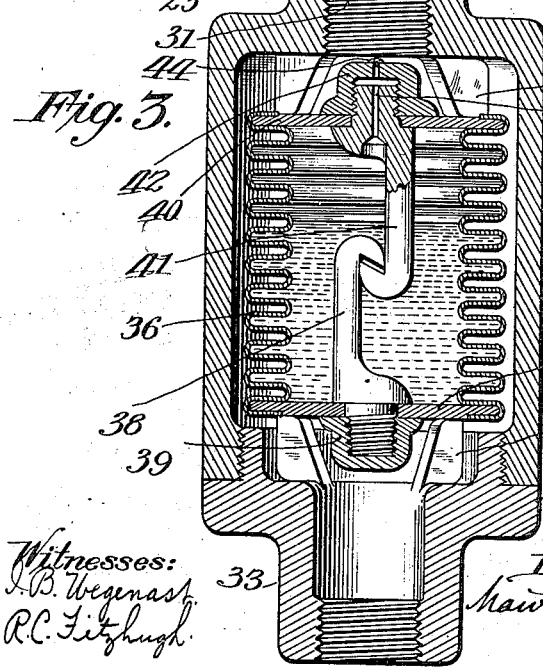
Figure 4:
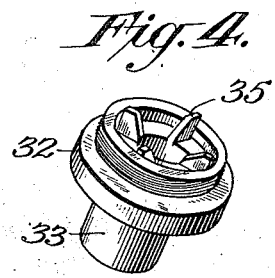

In the drawings:—Figure 1 is a vertical central sectional view showing a quick acting faucet provided with my improvement; Fig. 2 is a vertical central sectional view showing a modified form of the construction in connection with a different type of faucet; Fig. 3 is a longitudinal sectional view through a conduit containing another form of my improvement; and Fig. 4 is a detail perspective view, on reduced scale, of a seat for one end of the collapsible and expansible vessel.

Referring to Fig. 1, 1 designates a casing the walls of which are made integral with the conduit walls of the faucet 2 of the quick-acting type, and at its lower part is open through an annular ledge 3 to the water pressure in the system. The top of the casing 1 is provided with a threaded shoulder which receives a screw-cap 4 provided with a depending tubular member 5 extending into a collapsible and expansible vessel 6, the upper end of which is provided with a flange portion 7 adapted to be held fast between the cover 4 and the end of the casing wall.

The lower end of the vessel 6 is provided with an end closure 8 reinforced by a plate 9. As shown, this closure is made integral with the walls of the vessel, but obviously it may be made of a separate inflexible plate soldered or brazed to the wall. Within the tube 5 is a spring 10 bearing against plate 9 at its lower end and provided with a follower 11 at its upper end. Passing through a threaded opening in cap 4 is a pressure-adjusting screw 12 which has a reduced end portion 13 loosely entering a socket in follower 11 and is provided with graduations properly designated to indicate pressures. 14 is a cap for protecting the free end of this screw. The length of vessel 6 is normally somewhat longer than the length of the casing 1, so that the cap 4 when screwed down will slightly compress the vessel and hold it under pressure against ledge 3.

In assembling the device, the vessel 6 is inserted in the casing with its lower end resting on ledge 3 and its upper end slightly protruding above the casing wall. The spring 10 is laced in central position in the vessel and the tube 5 on cap 4 is slipped over the spring. The cap is pressed down on the flange of the vessel and screwed down to make a water-tight joint. The screw 12 is then screwed down to a position which applies pressure on the end wall of vessel 6 to give a pressure indicated on its stem corresponding to the known water pessure in the conduit. The device is now ready for operation, which will be readily understood from the above description.

Assuming the faucet to have been opened to discharge water and then closed to cut off the flow, the water in the pipe tends to continue its movement and possesses a certain amount of momentum, the change in which, caused by closing the faucet, is manifested as force or pressure on the walls of the conduit. The intensity of this force is measured by the rate of change in the momentum, as may be evidenced by turning off an ordinary faucet quickly or slowly and noting the hammering effects resulting. In applicant's device, this rate of change of momentum is decreased by the progressively increased resistance of the yielding means associated with it, and the intensity of the force developed is diminished to an extent suitable for preventing the hammering action. The energy of the moving mass of water spends itself in harmless compression of the spring and the walls of the vessel. To protect the corrugated walls during this compression, the tube 5 acts as a stop to prevent sharp bends in the corrugations and to avoid cracks in the wall, while during extension by the spring 10 the ledge 3 acts to protect the walls.

Instead of providing a side chamber in the wall of the conduit, the conduit may be enlarged and the vessel located in the line of flow of the water. In Fig. 2, a type of faucet is shown in which the valve 14' is opened against the water pressure and is held seated by a spring 15 assisted by pressure in the main. Valves of this kind are peculiarly subject to deterioration by the hammering action of the water and are protected from this action by use of my improvement. The faucet is provided with a housing or barrel portion 16 adapted to be screwed into a cap connection 22. Within the barrel 16 is located the collapsible and expansible vessel 17, the ends of which are closed by centrally perforated inflexible walls 18, 19 soldered or brazed thereto. To the central part of end wall 19 is secured a cap nut 20 which has a reduced threaded stud 21 adapted to be screwed into a threaded socket formed in the wall of the faucet to support the vessel. End wall 18 is also provided with a perforated cap nut 23 fast thereto. Means are provided for limiting the extension of the vessel and consist of a stud 24 having a threaded end engaging cap nut 20, and a tubular portion 25 for receiving stud 24 and having a threaded extension engaging cap nut 23. The tube has a slot 26 through which projects a pin 27 fast to the stud 24. In assembling the parts, stud 24 is inserted in tube 25 and pin 27 inserted through slot 26. End closure 19 is soldered to the end wall of the vessel and the threaded end of stud 24 passed through the opening in the wall 19. The end wall 18 is soldered on, leaving the threaded end of tube 25 projecting through its central opening. Both cap nuts 20 and 23 are screwed onto the threaded extremities of the stud 24 and tube 25, respectively, and then soldered to the end walls 18 and 19. A passage 28 is left open for charging the vessel with compressed air, the amount of compression suiting the pressure in the system, and when this is done the passage is closed by a drop of solder 29. The pin 27 prevents the pressure in the vessel from stretching it beyond its elastic limits, and also serves as a limiting means to the collapse of the walls. The vessel is placed in the housing 16 and the threaded hub on cap 20 is screwed into the faucet wall. Owing to the fact that the internal air pressure is substantially the same as the water pressure in the system and the further fact that the momentary increase in pressure of the water when the faucet is closed is accompanied by an equal and opposite increase of pressure inside the vessel by compression of the air, the walls of the vessel are at no time subjected to strains due to external pressure. The operation of the vessel in absorbing the shock of the water is in other respects like that described in connection with the first described form of my invention.

In Figs. 3 and 4, the invention is shown embodied in another form in which the collapsible and expansible vessel is housed in a casing 30 having a tapped opening 31 at one end for connecting with a water pipe. The opposite end is interiorly threaded to receive a screw-cap 32 having a tapped extension 33 for connection with another conduit. A plurality of lugs 34 formed integral with the casing 30 are arranged around the tapped opening 31, and a similar group of lugs 35 is provided on the interior of cap 32. The collapsible and expansible vessel 36 is provided with an end closure 37 having a central opening through which is inserted the threaded end of a hook member 38, on which a cap 39 is screwed and soldered in place. 40 is an end wall supporting in a similar manner a companion hook member 41 and a cap 42. A passage 43 is provided through the cap and end of the hook for giving access to the vessel after the head 40 is secured to the end of the vessel and the hooks are properly engaged for limiting the extension of the vessel. Liquid, preferably water, is introduced through the passage 43 into the vessel to partly fill the same. The space left in the vessel is charged with air under pressure and the end of the passage 43 is sealed by a drop of solder 44. The charged vessel is placed in the casing 30 and the cap 32 is screwed on to hold and center the vessel in between lugs 34 and 35. The casing 30 may be inserted in the line to permit water to flow past the collapsible and expansible vessel in either direction. Its operation as a shock absorber is like that shown in Fig. 2, except that the water in the vessel acts as a means for limiting the collapse of the walls of the vessel and offers the advantage of distributing pressure to all points of the wall when it is collapsed to its extreme position and thereby avoids all possibility of local strains on the wall at such times.

What is claimed is:—

1. A shock absorber for water pipes comprising in combination, a conduit, a corrugated collapsible and expansible metal vessel exposed on one side to water pressure in said conduit which tends to collapse the vessel, and means for applying to the said vessel a resistance to balance the normal water pressure and adapted to yield with increasing resistance for pressures above said normal pressure.

2. A shock absorber for water pipes comprising in combination, a conduit, a corrugated collapsible and expansible metal vessel exposed to water pressure in said conduit which tends to collapse the vessel, means for applying to said vessel a resistance equal to and in opposition to the normal water pressure in the conduit and adapted to yield with increasing resistance to pressures above said normal pressure, and means for preventing the extension and collapse of said wall beyond its elastic limits.

3. A shock absorber for water pipes comprising in combination, a conduit having a chamber open thereto, a corrugated collapsible and expansible metal vessel in said chamber exposed to water pressure in said conduit which tends to collapse the same, and a spring for applying to the vessel a pressure equal to and in opposition to the normal water pressure in the conduit.

4. A shock absorber for water pipes comprising in combination, a conduit having a chamber opening into said conduit, a corrugated collapsible and expansible metal vessel in said chamber exposed to the water pressure in said conduit which tends to collapse the vessel, a spring for applying to the vessel a pressure equal to and in opposition to the normal water pressure in the conduit, and a tubular stop for limiting the vibratory movements of said vessel.

5. A shock absorber for water pipes comprising in combination, a conduit having a chamber opening into said conduit, a corrugated collapsible and expansible metal vessel in said chamber exposed to water pressure in the conduit which tends to collapse the vessel, a spring for applying to the vessel pressure equal to and in opposition to the normal water pressure in the conduit, means for adjusting the tension of the spring for different normal water pressures, and means limiting the vibratory movements of said vessel in both directions.

6. In combination a conduit provided with a quick acting water faucet and having a casing opening at one end into said conduit in proximity to said faucet, a collapsible and expansible corrugated metal vessel within said casing, and having flanges at one end and a closure at the opposite end adapted to close said opening, a screw cap for clamping said flanges to the end walls of said casing and having a tubular member extending into said vessel for limiting its collapse, and a spring within said tubular extension provided with tension adjusting means for applying yielding pressure in opposition to the water pressure on the end closure.

In testimony whereof I have signed this specification in the presence of two subscribing witnesses.

WESTON M. FULTON.

Witnesses:
H. T. PATTON,
C. P. MILLS.